Patented Dec. 4, 1928.

1,694,117

UNITED STATES PATENT OFFICE.

HEINZ EICHWEDE, OF HOCHST-ON-THE-MAIN, GERMANY, ASSIGNOR TO GRASSELLI DYESTUFF CORPORATION, OF NEW YORK, N. Y., A CORPORATION OF DELAWARE.

AZO DYESTUFFS AND PROCESS FOR PREPARING THE SAME.

No Drawing. Application filed December 21, 1926, Serial No. 156,259, and in Germany December 23, 1925.

The present invention relates to new azo dyestuffs and to a process of preparing same.

I have found that dyestuffs of excellent properties as to fastness can be obtained by combining diazotized 5-nitro-2-amino-1-phenol or 5-nitro-4-chloro-2-amino-1-phenol with a pyrazolone of the general formula:

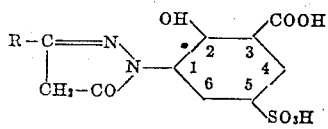

wherein R stands for —$CH_3$, —COOH or —COO-alkyl. The dyestuffs thus obtained dye wool yellowish- to brownish-red tints, which, by after-chroming, change to bluish-red to claret-red shades of excellent properties to fulling, potting and light.

The following example serves to illustrate my invention but is not intended to limit it thereto, all parts being by weight:

The diazo compound obtained from 154 parts of 5-nitro-2-amino-1-phenol, 300 parts of hydrochloric acid of 20° Bé. and 69 parts of sodium nitrite is run into a solution of 314 parts of 1(2'-hydroxy-3'-carboxy-5'-sulfophenyl)-3-methyl-5-pyrazolone in an excess of sodium carbonate or sodium acetate. The dyestuff thus obtained is salted out and isolated in known manner. It has the probable formula

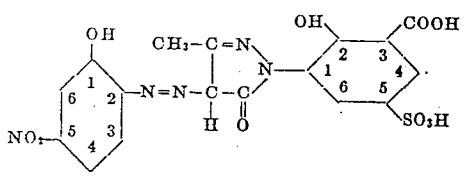

and forms when dry a brown powder and dyes wool a brownish-yellow tint, which on subsequently chroming changes to an intense red tint of very good fastness to fulling, potting and light. The dyestuff when printed on cotton in combination with chromium salts gives bright red prints of good fastness to washing and chlorine.

Dyestuffs of similar shades and properties are produced by replacing the 5-nitro-2-amino-1-phenol by the 5-nitro-4-chloro-2-amino-1-phenol, and the 1-(2'-oxy-3'-carboxy-5'-sulfophenyl)-3-methyl-5-pyrazolone by the 1-(2'-oxy-3'-carboxy-5'-sulfophenyl)-5-pyrazolone-3-carboxylic acid or by a 1-(2'-oxy-3'-carboxy-5'-sulfophenyl)-5-pyrazolone-3-carboxylic acid ester.

I claim:

1. The process for preparing new azo dyestuffs which consists in diazotizing a compound of the following formula:

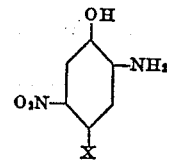

wherein X stands for hydrogen or chlorine, and in coupling the diazo compound thus obtained with a compound of the following constitution:

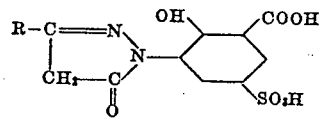

wherein R represents: —$CH_3$, —COOH or —COO.alkyl.

2. The process for preparing new azo dyestuffs which consists in diazotizing 5-nitro-2-amino-1-phenol of the following constitution:

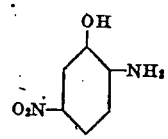

and in coupling the diazo compound thus obtained with a compound of the following constitution:

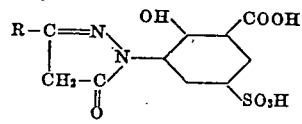

wherein R represents: —$CH_3$, —COOH or —COO.alkyl.

3. The process for preparing a new azo dyestuff which consists in diazotizing 5-nitro-2-amino-1-phenol of the following constitution:

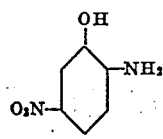

and in coupling the diazo compound thus obtained with a compound of the following constitution:

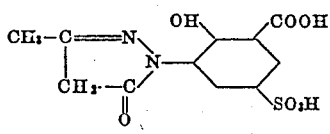

4. As new products, azo dyestuffs of the general formula:

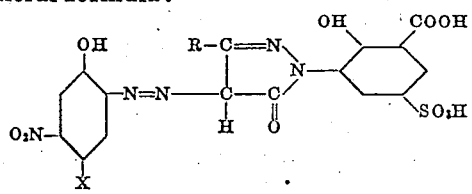

wherein X represents hydrogen or chlorine and R stands for
—CH₃, —COOH or —COO.alkyl.

5. As new products azo dyestuffs of the general formula:

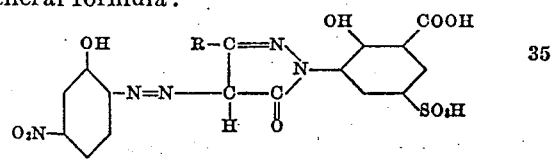

wherein R stands for —CH₃, —COOH or —COO.alkyl.

6. As a new product the azo dyestuff of the following formula:

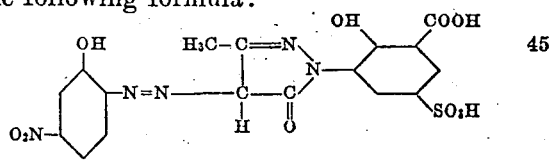

7. As new products azo dyestuffs of the general formula:

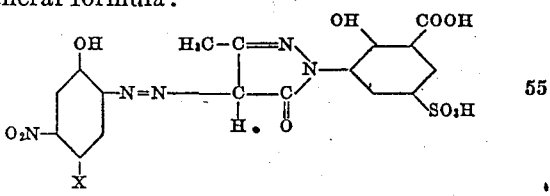

wherein X represents hydrogen or chloride.
In testimony whereof, I affix my signature.
HEINZ EICHWEDE.